United States Patent
Kulkarni et al.

(10) Patent No.: US 11,950,107 B2
(45) Date of Patent: Apr. 2, 2024

(54) WIRELESS FREQUENCY BAND-STEERING DEVICE

(71) Applicant: NXP USA, Inc., Austin, TX (US)

(72) Inventors: Anup Ramesh Kulkarni, Santa Clara, CA (US); Zhengqiang Huang, Dublin, CA (US); Xiaohua Luo, Cupertino, CA (US); Devidas Anant Puranik, Pune (IN); Mahesh More, Pune (IN)

(73) Assignee: NXP USA, Inc., Austin, TX (US)

( * ) Notice: Subject to any disclaimer, the term of this patent is extended or adjusted under 35 U.S.C. 154(b) by 235 days.

(21) Appl. No.: 17/347,667

(22) Filed: Jun. 15, 2021

(65) Prior Publication Data
US 2022/0400389 A1    Dec. 15, 2022

(51) Int. Cl.
*H04W 16/28* (2009.01)
*H04W 72/0453* (2023.01)
*H04W 88/08* (2009.01)

(52) U.S. Cl.
CPC ....... *H04W 16/28* (2013.01); *H04W 72/0453* (2013.01); *H04W 88/08* (2013.01)

(58) Field of Classification Search
CPC . H04W 16/28; H04W 72/0453; H04W 88/08; H04W 84/12
See application file for complete search history.

(56) References Cited

U.S. PATENT DOCUMENTS

| | | | |
|---|---|---|---|
| 8,655,278 B2 | 2/2014 | Laroche et al. | |
| 8,687,512 B2 | 4/2014 | Iyer | |
| 2012/0243474 A1* | 9/2012 | Iyer | H04L 63/1466 |
| | | | 370/328 |
| 2016/0057721 A1* | 2/2016 | Chandrashekar | H04W 84/00 |
| | | | 370/350 |
| 2018/0063165 A1* | 3/2018 | Mankovskii | H04W 12/08 |
| 2018/0352493 A1* | 12/2018 | Strater | H04W 36/08 |
| 2019/0075469 A1* | 3/2019 | Mahoney | H04W 16/10 |
| 2019/0261370 A1* | 8/2019 | Amini | H04L 1/0003 |
| 2019/0281446 A1 | 9/2019 | Shanbhag | |
| 2021/0289506 A1* | 9/2021 | Puranik | H04W 48/20 |
| 2021/0385733 A1* | 12/2021 | Zerumsky | H04W 88/08 |
| 2022/0368511 A1* | 11/2022 | Rahman | H04L 5/1469 |
| 2023/0131920 A1* | 4/2023 | Khoury | H04W 8/005 |
| | | | 370/252 |

OTHER PUBLICATIONS

Cisco Meraki; "802.11 Association Process Explained"; retreived from the Internet—https://documentation.meraki.com/MR/WiFi_Basics_and_Best_Practices/802.11_Association_Process_Explained—May 26, 2021; 5 pages (Oct. 5, 2020).

(Continued)

*Primary Examiner* — Abdullahi Ahmed

(57) ABSTRACT

One example discloses a first wireless device, including: a band-steering device including a band-detection element and a band-steering element; wherein the band-detection element is configured to receive a first signal from a second wireless device and detect from the first signal if the second device has multi-band capability; and wherein the band-steering element is configured to respond to the first signal by transmitting a second signal to the second device in a preferred band.

23 Claims, 4 Drawing Sheets

(56) References Cited

OTHER PUBLICATIONS

Unknown; "Wi-Fi Direct Overview and Features"; retreived from the Internet—https://hsc.com/DesktopModules/DigArticle/Print.aspx?PortalId=0&ModuleId=1215&Article=221 on May 26, 2021; 14 pages (2013).
WiFi Alliance; "Discover Wi-Fi"; retreived from the Internet https://www.wi-fi.org/discover-wi-fi/wi-fi-direct on May 26, 2021; 4 pages (2021).
WiFi Alliance; "Wi-Fi Peer-to-Peer (P2P) Technical Specification—Version 1.5"; retreived from the Internet https://cse.iitkgp.ac.in/~bivasm/sp_notes/wifi_direct_2.pdf on May 26, 2021; 183 pages (2014).

* cited by examiner

WIRELESS FREQUENCY BAND-STEERING DEVICE

The present specification relates to systems, methods, apparatuses, devices, articles of manufacture and instructions for wireless frequency band-steering.

SUMMARY

According to an example embodiment, a first wireless device, comprising: a band-steering device including a band-detection element and a band-steering element; wherein the band-detection element is configured to receive a first signal from a second wireless device and detect from the first signal if the second device has multi-band capability; and wherein the band-steering element is configured to respond to the first signal by transmitting a second signal to the second device in a preferred band.

In another example embodiment, the band-steering element is configured to disable an SSID-broadcast from the first wireless device in response to the first signal.

In another example embodiment, the first device is embedded in a wireless access point (AP); and the second device is embedded in a client station (STA).

In another example embodiment, the first device is a Wi-Fi Peer-to-Peer Group Owner (P2P-GO); and the second device is a Wi-Fi Peer-to-Peer Client (P2P-Client).

In another example embodiment, the first signal is a probe request; and the probe request includes an identifier defining a set of multi-band capabilities associated with the second device.

In another example embodiment, the first signal is a provision discovery request; and the provision discovery request includes an identifier defining a set of multi-band capabilities associated with the second device.

In another example embodiment, the band-detection element is configured to detect a set of multi-band capabilities for the second device from a previously populated look-up table.

In another example embodiment, the band-detection element is configured to receive the first signal from the second device in a first band and receive a second signal from the second device in a second band; and the band-detection element is configured to detect from the signals received in the first and second bands that the second device has multi-band capability.

In another example embodiment, the first signal is a connection request; and if the connection request includes a VHD (very high-density) field, then the band-detection element is configured to conclude that the second device has multi-band capability.

In another example embodiment, the band-steering element is configured to define a set of preferred-bands and a set of non-preferred bands for communication with the second device.

In another example embodiment, the preferred-bands and the non-preferred bands dynamically change based on a set of communications traffic received by the first wireless device before the first signal is received.

In another example embodiment, the first signal is a connection request; the band-steering element is configured to define a blocking period in response to receiving the connection request on a non-preferred band; and the band-steering element is configured to disable a beacon broadcast from the first wireless device in the non-preferred band during the blocking period.

In another example embodiment, the blocking period is a time window.

In another example embodiment, the blocking period is a total number of connection requests received by the first device from the second wireless device.

In another example embodiment, the blocking period begins when the second device sends the connection request on a non-preferred band;

In another example embodiment, the band-steering element is configured to end the blocking period if the second device sends the connection request on a preferred band.

In another example embodiment, the blocking period is configured to be large enough such that if the second device has multi-band capability, the second device will, after receiving no response to the connection request on the non-preferred band, send a new connection request on the preferred band.

In another example embodiment, the blocking period is configured to be small enough such that a third wireless device previously connected to the first wireless device will not disconnect or disassociate from the first wireless device during the blocking period.

In another example embodiment, the band-steering element is configured to permit the first wireless device to connect with the second wireless device on the non-preferred band after expiration of the blocking period.

In another example embodiment, the first signal is a connection request; the band-steering element is configured to define a blocking period; and the band-steering element is configured to prevent the first wireless device from sending a connection response to the connection request in the non-preferred band during the blocking period.

In another example embodiment, the band-steering element is configured to permit the first wireless device to connect with the second wireless device on a non-preferred band if the band-detection element determines that the second device does not have multi-band capability.

In another example embodiment, band includes a bandwidth about a predetermined center-frequency.

According to an example embodiment, a method of distributing instructions, stored on a non-transitory, tangible computer readable storage medium, for configuring a first wireless device: wherein the first wireless device includes a band-steering device having a band-detection element and a band-steering element; wherein the instructions include, receiving a first signal from a second wireless device; detecting from the first signal if the second device has multi-band capability; and responding to the first signal by transmitting a second signal to the second device in a preferred band.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
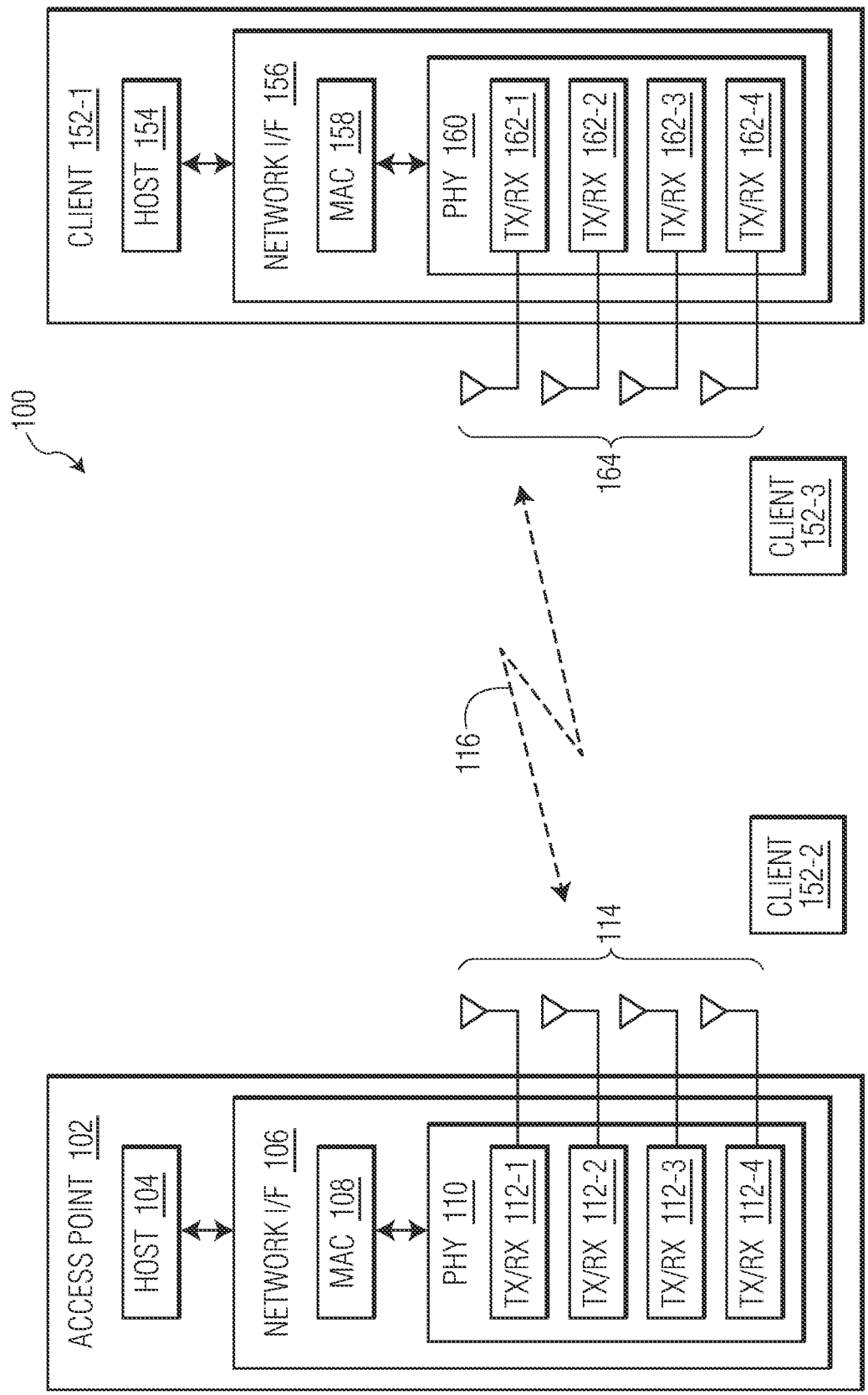
FIG. 1 represents a first example wireless communications network.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth].

As wireless local area networks (WLAN/WiFi/WiFi-Direct/etc.) have grown rapidly and used extensively as a wireless access technology, these various standards have provided even more transmission data rate options based on a greater number of channel center frequencies (e.g. 900 MHz, 2.4 GHz, 3.6 GHz, 4.9 GHz, 5 GHz, 5.9 GHz, 6 GHz and 60 GHz), channel widths (e.g. 20 MHz, 40 MHz, 80 MHz, 160 MHz), guard intervals (800 ns, 400 ns), and number of spatial streams (1 ss, 2 ss, 3 ss, 4 ss).

FIG. 1 represents a first example 100 wireless communications network (WLAN) formed by a set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor 108 and physical layer (PHY) processor 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs, encapsulate the MAC SDUs into a special PDU called a PPDU (Physical Layer Convergence Procedure (PLCP) PDU) by adding a preamble.

The preamble (i.e. TXVECTOR, transmission vector) specifies the PPDU's transmission format (i.e. which IEEE protocol (e.g. EHT, HE, etc.) has been used to pack the SDU data payload). The PPDU preambles may include various training fields (e.g. predetermined attributes) that are used by the receiving APs or STAs to perform synchronization, gain control, estimate channel characteristics, and signal equalization. The AP 102 and STA 152-1 then exchange the PPDU formatted wireless communications signals 116.

Now discussed are example embodiments of a wireless frequency band-steering (BS) device that includes a frequency band-detection element and a frequency band-steering element to better support an increasing number of wireless stations (STA) (i.e. clients) connecting to a single wireless Access Point (AP) for better wireless band/bandwidth management.

The discussion that follows is applicable to both legacy AP to STA/client connections as well as Wi-Fi Direct Peer-to-Peer Group Owner (P2P-GO) to Peer-to-Peer Clients (P2P-Clients) connections. Legacy WiFi topologies have a fixed AP to STA/client association, while WiFi-Direct topologies negotiate as to which wireless device node will function as an AP Group Owner and which will function as the STA/client.

Figure 2:
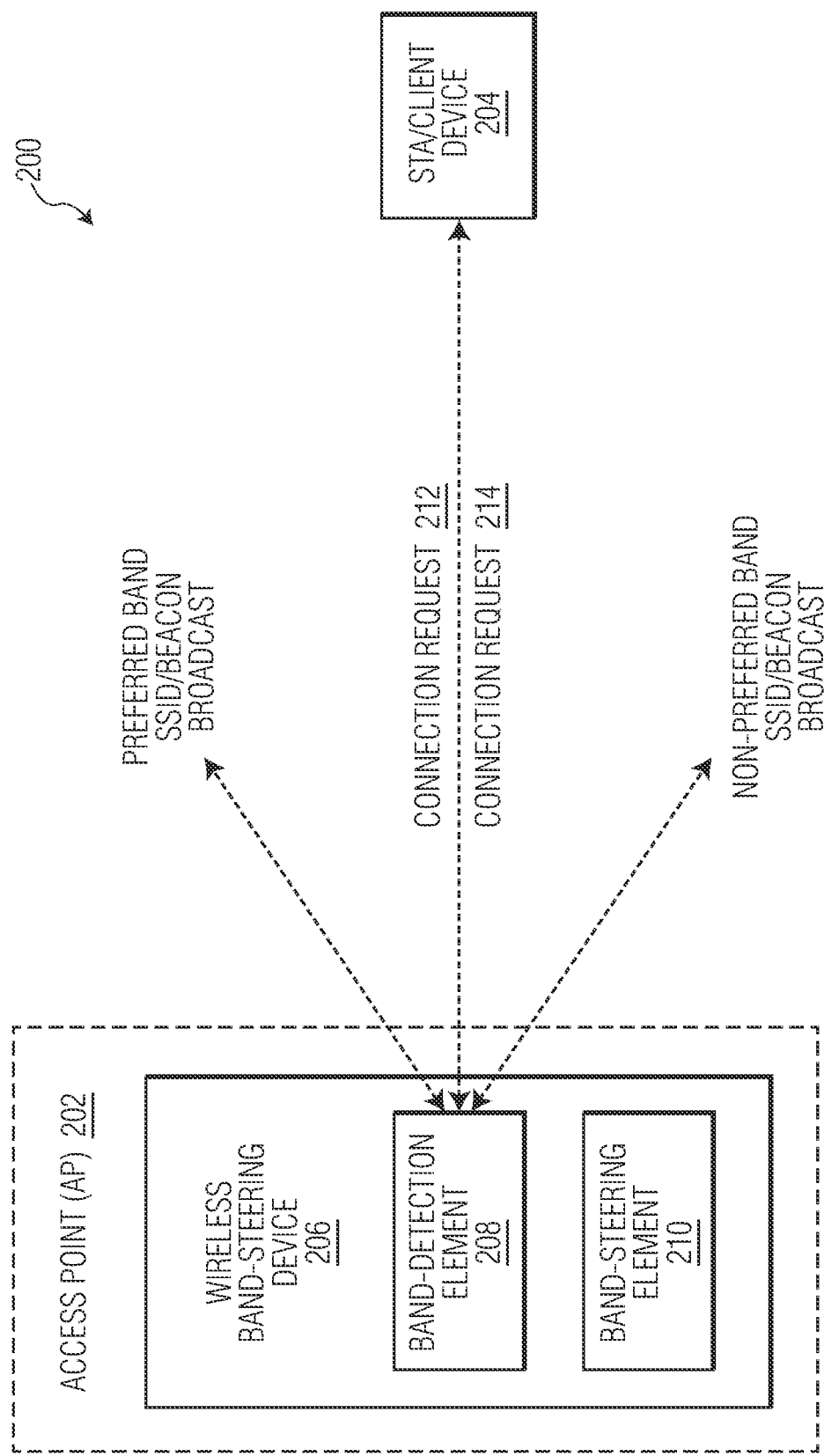
FIG. 2 represents a second example wireless communications network.

FIG. 2 represents a second example 200 wireless communications network. The example 200 wireless communications network formed by a set of wireless communications devices includes an access point (AP) 202 and a STA/client device 204. The AP 202 includes a band-steering device 206 that in some example embodiments operates in a software layer of the AP 202. The band-steering device 206 includes a band-detection element 208 and a band-steering element 210.

The AP 202 continuously transmits a beacon signal (e.g. SSID (Service Set Identifier) Broadcast signal) on one or more communications bands announcing its availability for communications with other wireless devices, such as the STA/client device 204.

"Band" is herein defined as including a bandwidth about a predetermined center-frequency. "Band" is also defined to include one or more channels defined about a predetermined center-frequency. For example, "a 2G band" can be defined as having a 2.4 GHz center-frequency and a bandwidth of 20 MHz that is divided into four separate channels separated by 5 MHz. In another example, "a 5G band" can be defined as having a 5 GHz center-frequency and a bandwidth of 80 MHz that is divided into four separate channels separated by 20 MHz.

The STA/client device 204 is configured to send a connection request 212 to the AP 202, and the AP 202 is configured to send a connection response 214 back to the STA/client device 204 if a wireless communications link is to be established. Once established, the STA/client device 204 and the AP 202 can communicate by exchanging information packets.

Detection of Multi-Band Capabilities

The band-detection element 208 is configured to detect if the STA/client device 204 is multi-band capable based on attributes of and/or data within the connection request 212 from the STA/client device 204.

In some example embodiments, the connection request 212 is a probe request. A probe request is a wireless message transmitted from a wireless device for the purpose of identifying nearby wireless devices (e.g. local network nodes) and their capabilities. The STA/client device 204 broadcasts probe requests to discover the AP 202 and any other wireless networks within its signal range. The STA/client device's 204 probe request includes identifiers that advertise its supported bands, data rates and other wireless capabilities. For example, if the AP 202 receives the probe request on a 2G band and the probe request includes a VHD (very high-density) identifier, then the band-detection element 208 can conclude that the STA/client device's 204 also has 5G band capability since a VHD field in a 2G probe request indicates the STA/client device's 204 5G band capability.

In other example embodiments, the connection request 212 is a provision discovery request. A provision discovery (PD) request (i.e. WiFi-Direct) indicates that the STA/client 204 is attempting to connect using a Wi-Fi-Direct (e.g. P2P-GO, P2P-Client) protocol. WiFi Direct is a negotiated peer-to-peer wireless connection. Provision Discovery Request frames and Provision Discovery Response frames are exchanged between at least two wireless devices as part of that negotiation. These Request/Response frames propose and confirm a set of connectivity attributes between the two wireless devices, and include a communications band on which the devices will communicate and an identifier defining a set of multi-band capabilities (e.g. WPS IE).

There are other example embodiments, the connection request 212 includes one or more identifiers that enable the band-detection element 208 to access a previously populated look-up table (e.g. Transient DB, vendor specific IE, etc.) that enables the STA/client device 204 to be mapped to a set of multi-band capabilities.

If the AP 202 receives the connection request 212 from the STA/client device 204 in a first band (e.g. 2G) and receives a second connection request from the STA/client device 204 in a second band (e.g. 5G) then the band-detection element 208 will also know that the STA/client device 204 has multi-band capabilities.

Steering of Multi-Band Capable Devices

The band-steering element 210 is configured to define a set of preferred-bands and a set of non-preferred bands for communication with the second device. These preferred-bands and the non-preferred bands may dynamically change based on a set of communications traffic management optimization routines hosted by the AP 202.

If the STA/client device 204 is multi-band capable, the band-steering element 210 is configured to steer the STA/client device 204 toward one or more preferred bands and away from one or more non-preferred bands (e.g. 2 GHz band or 5 GHz band) if the AP 202 receives the connection request 212 on a non-preferred band.

In one example steering technique, the band-steering element 210 is configured to disable the AP's 202 SSID-broadcast on a non-preferred band upon receiving the connection request 212 from the STA/client device 204 on the non-preferred band.

In another example steering technique, the band-steering element 210 is configured to respond to the connection request 212 by transmitting a connection response 214 to the STA/client device 204 in only a preferred band.

In some example embodiments to support band-steering, the band-steering element 210 is configured to define a blocking period (e.g. either a time window or a number of connection attempts (e.g. probe requests received) counter).

During the blocking period, if the band-steering element 210 in the AP 202 receives a probe (e.g. connection) request from a STA/client device 204 attempting to connect on a non-preferred band, the band-steering element 210 temporarily disables its SSID-broadcast (e.g. Service Set Identifier, beacon, etc.) for that non-preferred band such that the STA/client device 204 does not have information that the AP 202 has such non-preferred band capability.

By disabling the broadcast SSID on the non-preferred band, the STA/client device 204 will not have information indicating that the AP 202 is broadcasting in the non-preferred band (e.g. perhaps to other STA/client devices). This avoids having the STA/client device 204 attempting to establish a connection on the non-preferred band that would have to be denied by the AP 202, resulting in the STA/client device 204 being disconnected from the non-preferred band and further delaying a preferred band connection with the AP 202.

In some example embodiments, the band-steering element 210 is also configured to block the AP 202 from sending any probe responses on the non-preferred band to the STA/client device 204 attempting to connect on the non-preferred band.

In some example embodiments, the SSID-broadcast is continuously disabled during the blocking period; however in other example embodiments the SSID-broadcast is only disabled until the STA/client device 204 later sends a probe request on the preferred band.

The blocking period is configured to be long enough such that if the STA/client device 204 has multi-band capability, the STA/client device 204 will, after receiving no response to it's probe request on the non-preferred band, switch to sending a new probe request on the preferred band, which the AP 202 will then accept (e.g. authenticate, associate, etc.).

The blocking period is configured to be short enough such that other STA/client devices already connected to the AP 202 are not disconnected/disassociated from the AP 202.

After expiration of the blocking period, even if the STA/client device 204 had multi-band capability, the STA/client device 204 is permitted to connect on either the preferred or non-preferred band.

If the band-detection element 208 determines that the STA/client device 204 does not have multi-band capability, then the band-steering element 210 allows the STA/client device 204 to connect on either the preferred or non-preferred band.

Several of the above example embodiments of band-steering are seamless in that the STA/client device 204 does not have information that a non-preferred band is available and thus does not begin an authentication/association sequence, only to have the AP 202 break such a sequence to direct the STA/client device 204 to a preferred band.

After the STA/client device 204 has been steered to the preferred band or allowed to connect on the non-preferred band, the band-steering element 210 re-enables the SSID-broadcast on all AP 202 capable bands (i.e. both previously non-preferred as well as previously preferred) so that the AP 202 can continue to communicate with all associated devices on various band.

Figure 3:
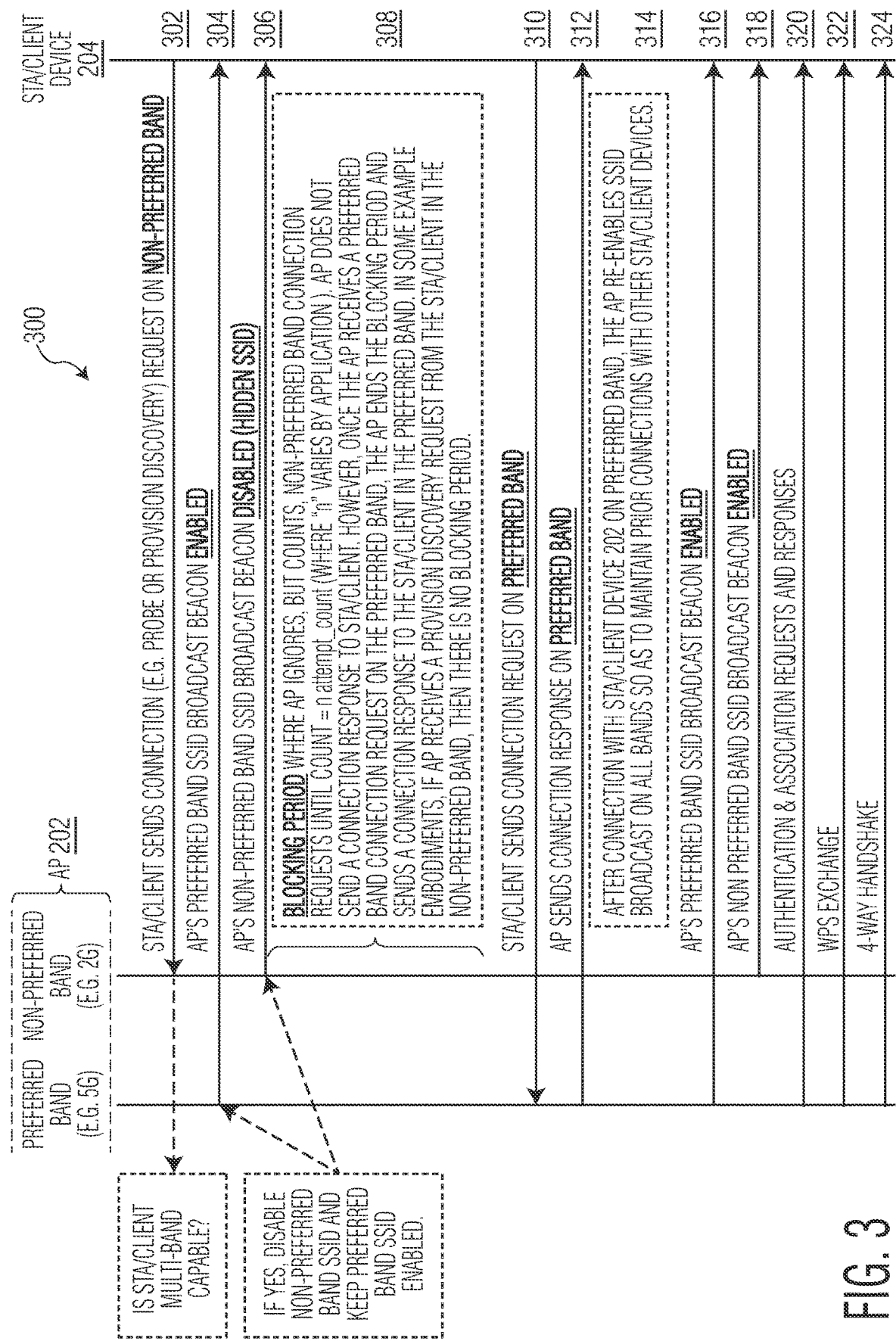
FIG. 3 represents an example wireless band-steering protocol for a multi-band capable STA/client device to connect to an access point.

FIG. 3 represents an example 300 wireless band-steering protocol for a multi-band capable STA/client device 204 to connect to an access point 202. In 302, STA/client sends connection (e.g. probe or provision discovery) request on non-preferred band. In 304, AP's preferred band SSID broadcast beacon Enabled. In 306, AP's non-preferred band SSID broadcast beacon Disabled (Hidden SSID). In 308, Blocking period where AP ignores, but counts, non-preferred band connection requests until count=n attempt_count (where "n" varies by application). AP does not send a connection response to STA/client. However, once the AP receives a preferred band connection request on the preferred band, the AP ends the blocking period and sends a connection response to the STA/client in the preferred band. In some example embodiments, if AP receives a provision discovery request from the STA/client in the non-preferred band, then there is no blocking period. In 310, STA/client sends connection request on preferred band. In 312, AP sends connection response on preferred band. In 314, After connection with STA/client device 202 on preferred band, the AP re-enables SSID broadcast on all bands so as to maintain prior connections with other STA/client devices. In 316, AP's preferred band SSID broadcast beacon Enabled. In 318, AP's non-preferred band SSID broadcast beacon Enabled. In 320, Authentication & Association Requests and Responses. In 322, WPS Exchange. In 324, 4-Way Handshake.

Figure 4:
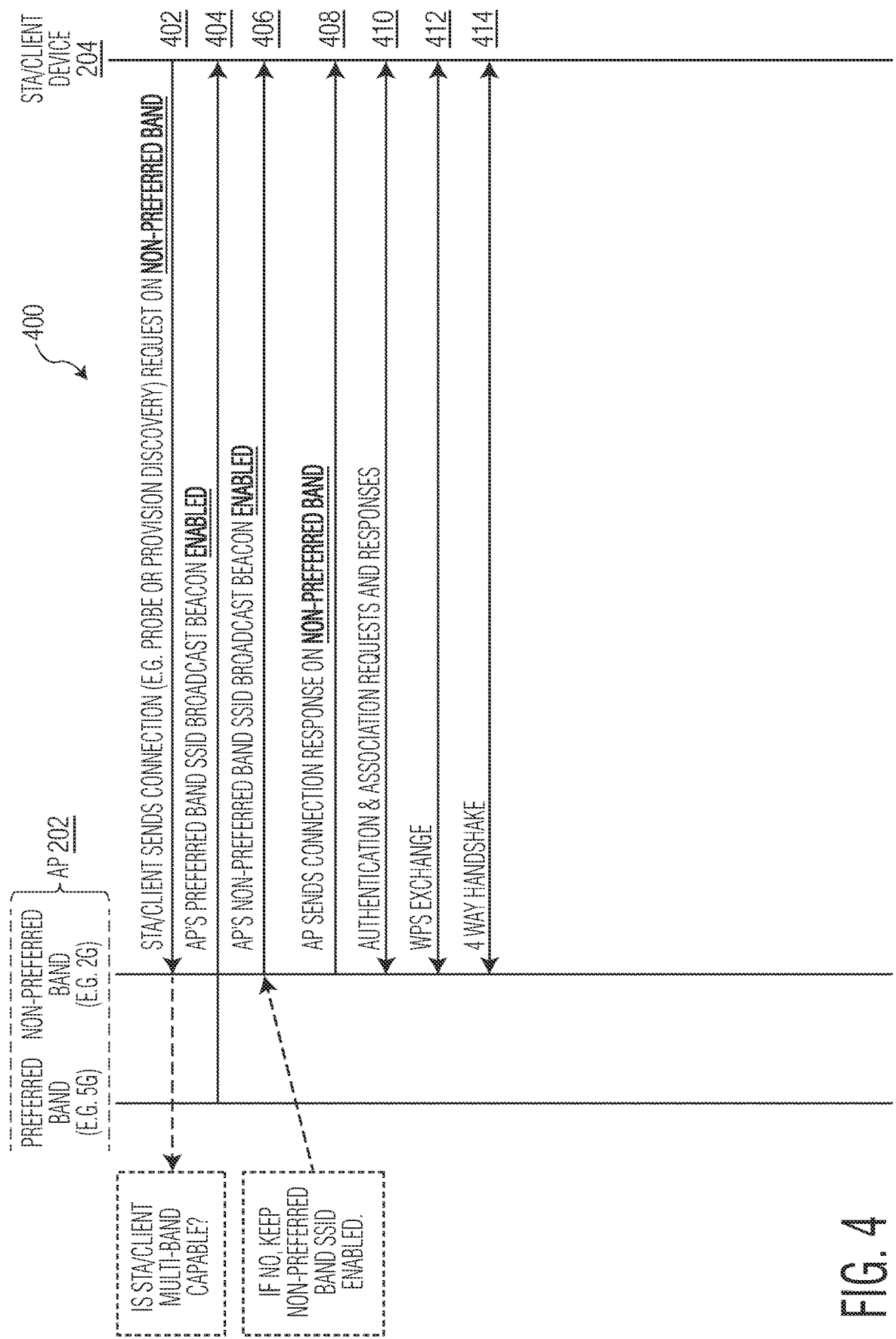
FIG. 4 represents an example wireless band-steering protocol for a single-band capable STA/client device to connect to an access point.

FIG. 4 represents an example 400 wireless band-steering protocol for a single-band capable STA/client device 204 to connect to an access point 202. In 402, STA/client sends connection (e.g. probe or provision discovery) request on non-preferred band. In 404, AP's preferred band SSID broadcast beacon Enabled. In 406, AP's non-preferred band SSID broadcast beacon Enabled. In 408, AP sends connection response on non-preferred band. In 410, Authentication & Association Requests and Responses. In 412, WPS Exchange. In 414, 4-Way Handshake.

In various example embodiments, the functionality and operations described above can be executed in any order, unless a specific order is explicitly stated. Also, those skilled in the art will recognize that while some example functions/operations/instructions/steps have been discussed, the material in this specification can be combined in a variety of ways to yield other examples as well, and are to be understood within a context provided by this detailed description.

In some example embodiments these functions/operations/instructions/steps are implemented as functional and software instructions. In other embodiments, the instructions can be implemented either using logic gates, application specific chips, firmware, as well as other hardware forms.

When the functions/operations/instructions/steps are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and

What is claimed is:

1. A first wireless device, comprising:
a band-steering device including a band-detection element and a band-steering element;
wherein the band-detection element is configured to receive a first signal from a second wireless device and detect from the first signal if the second device has multi-band capability;
wherein the band-steering element is configured to respond to the first signal by transmitting a second signal to the second device in a preferred band;
wherein the first signal is a connection request;
wherein the band-steering element is configured to define a blocking period in response to receiving the connection request on a non-preferred band; and
wherein the band-steering element is configured to disable a beacon broadcast from the first wireless device in the non-preferred band during the blocking period.

2. The device of claim 1:
wherein the first signal is either a connection request or a probe request; and
wherein the band-steering element is configured to disable either a Service Set Identifier (SSID) or a beacon broadcast from the first wireless device in response to receiving the connection request or the probe request.

3. The device of claim 1:
wherein the first device is embedded in a wireless access point (AP); and
wherein the second device is embedded in a client station (STA).

4. The device of claim 1:
wherein the first device is a Wi-Fi Peer-to-Peer Group Owner (P2P-GO); and
wherein the second device is a Wi-Fi Peer-to-Peer Client (P2P-Client).

5. The device of claim 1:
wherein the first signal is a probe request; and
wherein the probe request includes an identifier defining a set of multi-band capabilities associated with the second device.

6. The device of claim 1:
wherein the first signal is a provision discovery request; and
wherein the provision discovery request includes an identifier defining a set of multi-band capabilities associated with the second device.

7. The device of claim 1:
wherein the band-detection element is configured to detect a set of multi-band capabilities for the second device from a previously populated look-up table.

8. The device of claim 1:
wherein the band-detection element is configured to receive the first signal from the second device in a first band and receive a second signal from the second device in a second band; and
wherein the band-detection element is configured to detect from the signals received in the first and second bands that the second device has multi-band capability.

9. The device of claim 1:
wherein the first signal is a connection request; and
wherein if the connection request includes a very high-density (VHD) field, then the band-detection element is configured to conclude that the second device has multi-band capability.

10. The device of claim 1:
wherein the band-steering element is configured to define a set of preferred-bands and a set of non-preferred bands for communication with the second device.

11. The device of claim 10:
wherein the preferred-bands and the non-preferred bands dynamically change based on a set of communications traffic received by the first wireless device before the first signal is received.

12. The device of claim 1:
wherein the blocking period is a time window.

13. The device of claim 1:
wherein the blocking period is a total number of connection requests received by the first device from the second wireless device.

14. The device of claim 1:
wherein the blocking period begins when the second device sends the connection request on a non-preferred band.

15. The device of claim 1:
wherein the band-steering element is configured to end the blocking period if the second device sends the connection request on a preferred band.

16. The device of claim 1:
wherein the blocking period is configured to be large enough such that if the second device has multi-band capability, the second device will, after receiving no response to the connection request on the non-preferred band, send a new connection request on the preferred band.

17. The device of claim 1:
wherein the blocking period is configured to be small enough such that a third wireless device previously connected to the first wireless device will not disconnect or disassociate from the first wireless device during the blocking period.

18. The device of claim 1:
wherein the band-steering element is configured to permit the first wireless device to connect with the second wireless device on the non-preferred band after expiration of the blocking period.

19. The device of claim 1:
wherein the first signal is a connection request;
wherein the band-steering element is configured to define a blocking period; and
wherein the band-steering element is configured to prevent the first wireless device from sending a connection response to the connection request in the non-preferred band during the blocking period.

20. The device of claim 1:
wherein the band-steering element is configured to permit the first wireless device to connect with the second wireless device on a non-preferred band if the band-detection element determines that the second device does not have multi-band capability.

21. The device of claim 1:
wherein band includes a bandwidth about a predetermined center-frequency.

22. A method of distributing instructions, stored on a non-transitory, tangible computer readable storage medium, for configuring a first wireless device:
wherein the first wireless device includes a band-steering device having a band-detection element and a band-steering element;

wherein the instructions include,
receiving a first signal from a second wireless device;
detecting from the first signal if the second device has multi-band capability; and
responding to the first signal by transmitting a second signal to the second device in a preferred band;
wherein the first signal is a connection request;
wherein the band-steering element is configured to define a blocking period in response to receiving the connection request on a non-preferred ban&; and
wherein the band-steering element is configured to disable a beacon broadcast from the first wireless device in the non-preferred band during the blocking period.

23. A first wireless device, comprising:
a band-steering device including a band-detection element and a band-steering element;
wherein the band-detection element is configured to receive a first signal from a second wireless device and detect from the first signal if the second device has multi-band capability;
wherein the band-steering element is configured to respond to the first signal by transmitting a second signal to the second device in a preferred band;
wherein the first signal is a connection request;
wherein the band-steering element is configured to define a blocking period; and
wherein the band-steering element is configured to prevent the first wireless device from sending a connection response to the connection request in the non-preferred band during the blocking period.

* * * * *